United States Patent

[11] 3,585,882

| [72] | Inventor | James L. Miller<br>Hampton, Va. |
|---|---|---|
| [21] | Appl. No. | 751,266 |
| [22] | Filed | Aug. 8, 1968 |
| [45] | Patented | June 22, 1971 |
| [73] | Assignee | The United States of America as represented by the Administrator of the National Aeronautics and Space Administration |

[54] BORING BAR DRIVE MECHANISM
4 Claims, 7 Drawing Figs.

[52] U.S. Cl. .................................................... 408/137,
90/11
[51] Int. Cl. .................................................... B23b 39/14
[50] Field of Search .......................................... 90/11.1;
77/2, 3, 37—42, 34.4

[56] References Cited

UNITED STATES PATENTS

| 2,039,728 | 5/1936 | Lundell et al. ................ | 77/2 |
| 2,213,885 | 9/1940 | Petersen ....................... | 77/2 |
| 2,651,222 | 9/1953 | Mueller et al. ................ | 77/37 |
| 2,685,823 | 8/1954 | Kaiser .......................... | 90/11 |
| 2,833,167 | 5/1958 | Mueller ........................ | 77/42 |
| 2,838,964 | 6/1958 | Albertson et al. ............. | 77/37 |
| 2,883,889 | 4/1959 | Diener ......................... | 90/11 |

FOREIGN PATENTS

| 988,570 | 4/1965 | Great Britain ................ | 90/11 |

*Primary Examiner*—Gerald A. Dost
*Attorneys*—Howard J. Osborn and G. T. McCoy

ABSTRACT: A portable boring bar drive mechanism featuring a compacted gear train, a common feed and boring bar drive, and an automatic feed stop mechanism.

PATENTED JUN 22 1971

INVENTOR.
JAMES L. MILLER
BY H. McCoy
Howard J. Osborn
ATTORNEYS

FIG. 2

INVENTOR.
JAMES L. MILLER

BY
*[signature] McCoy*
*[signature] Howard J. Osborn*
ATTORNEYS

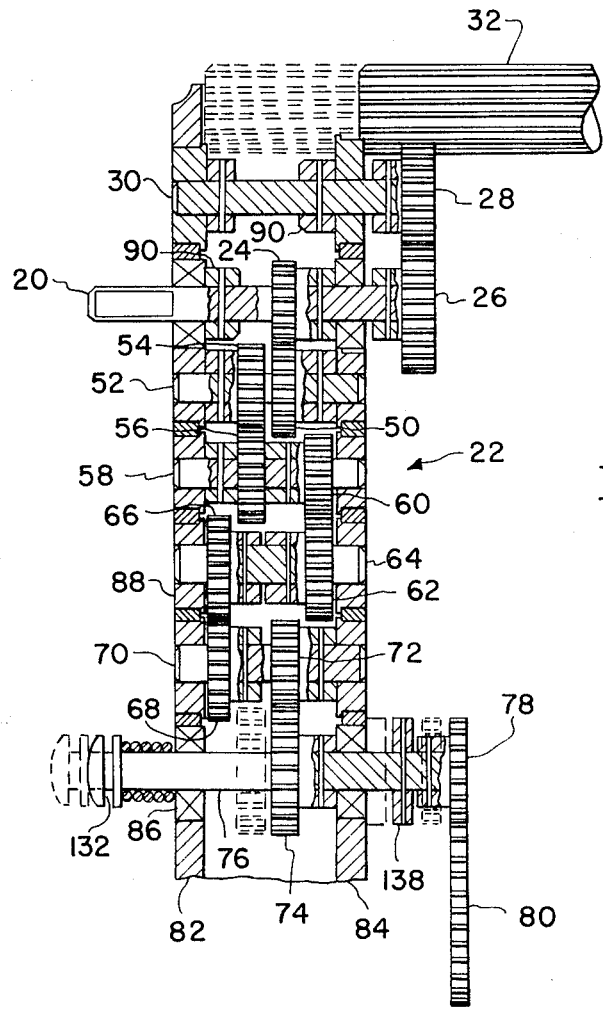
FIG. 3
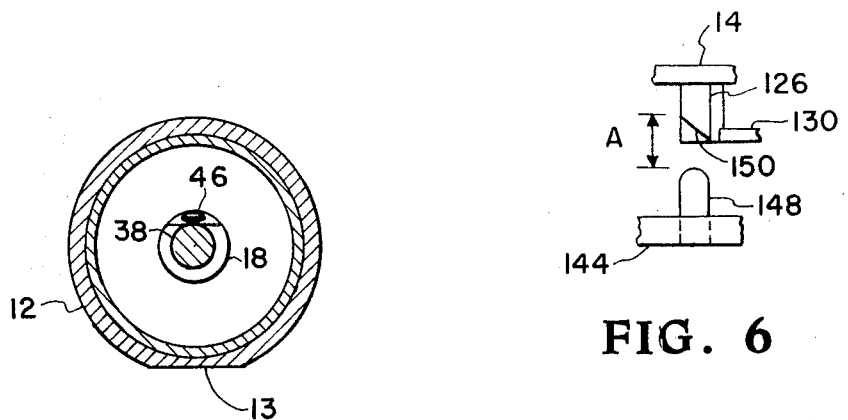
FIG. 7
FIG. 6
INVENTOR.
JAMES L. MILLER
BY
ATTORNEYS

BORING BAR DRIVE MECHANISM

This invention was made by an employee of the United States Government and may be used by or for the Government for governmental purposes without the payment of royalties thereon or therefor.

This invention relates to a boring bar drive mechanism particularly suited for portable use, such as for boring operation in extremely large items, or items of an explosive composition.

Prior art mechanisms directed to the problem of providing portable devices of this sort, while satisfactory in some respects, have usually resulted in designs which, while of reduced size in terms of conventional arrangements, still were rather cumbersome, with bulky gear reductions for the main drive, a separate gear train for the feed mechanisms, and lacking such refinements as an automatic feed stop, which is an important feature when boring blind holes, as is common use for such devices.

Therefore, it is an object of the present invention to provide a drive mechanism for a boring bar which is extremely compact, with a common power source for the main drive and the feed gearing, and which incorporates a simple but effective automatic feed stop mechanism.

In the drawings, FIG. 1 is an end view of the drive mechanism.

FIG. 2 is a view of a section taken along the lines 2-2 in FIG. 1.

FIG. 3 is a partially sectional development of the gearing arrangement of the drive mechanism.

FIG. 6 is a view taken in the direction of 6-6 in FIG. 1.

FIG. 7 is a view of the section taken along the line 7-7 in FIG. 2.

Figure 1:
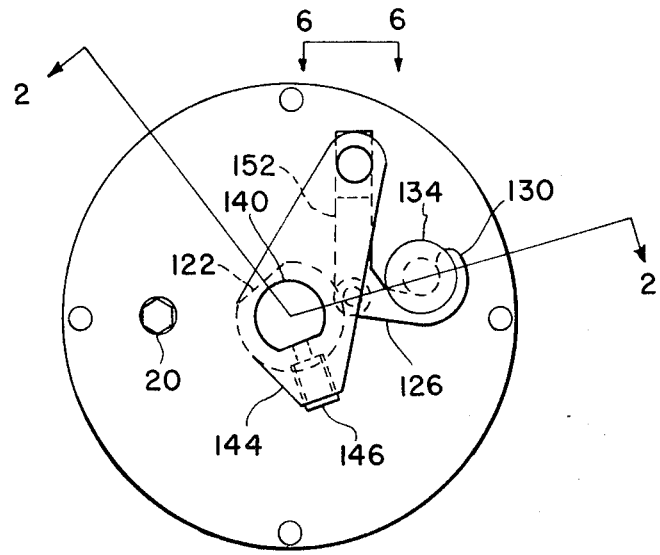

Referring now to the drawings, and particularly FIG. 2, the drive mechanism according to the present invention is indicated at 10. Main housing 12 serves to support and protect the internal parts, and is closed at the one end with end cap 14 and at the other by adapter cap 16. A flat 13 (FIGS. 2 and 7) is machined at a given distance from the center line of the device on the reduced end portion of the housing 12 in order to provide a reference surface to be used in a manner as will hereinafter be explained.

The boring bar 18 is advanced and rotated by means of input shaft 20 (FIGS. 1 and 3), which may be driven by a power tool or by hand, and the associated gearing indicated at 22 in FIG. 3.

As best seen in FIG. 3, input shaft 20 has fixed thereon gears 24 and 26, which serve to divide the power into two paths, one for advancing and the other for rotating the boring bar 18.

Figure 4:
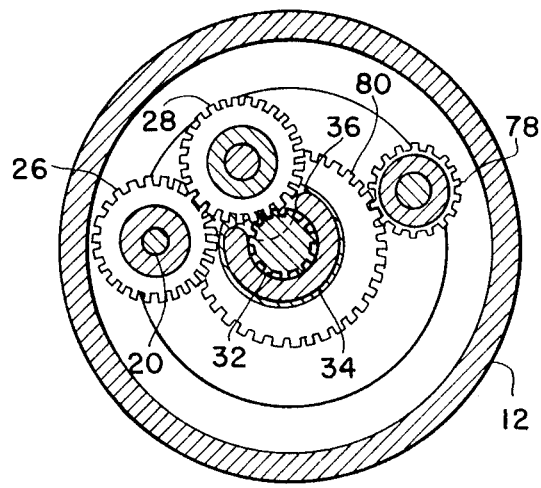
FIG. 4 is a view of the section taken along the lines 4-4 in FIG. 2.

In the first path, which is shown in FIG. 3 and 4, gear 26 drives idler 28 fixed to shaft 30, which in turn drives the main spline gear 32. This main spline gear 32 is supported and surrounded by carrier member 34, which has a longitudinal opening 36, and gear 28 is positioned, as seen in FIG. 4, to be opposite this opening, so as to enable it to be in mesh with the main spline gear 32.

As seen in FIGS. 2, a rotative power from gear 32 is transmitted to the boring bar 18, via the boring bar holder 38, which is pinned at 40 to a reduced end 42 of gear 32 inserted into a bore 44 of the boring bar holder 38. The boring bar 18 is secured to the holder 38 by means of a set screw 46 acting on a reduced portion of the boring bar inserted into a bore 48.

Figure 5:
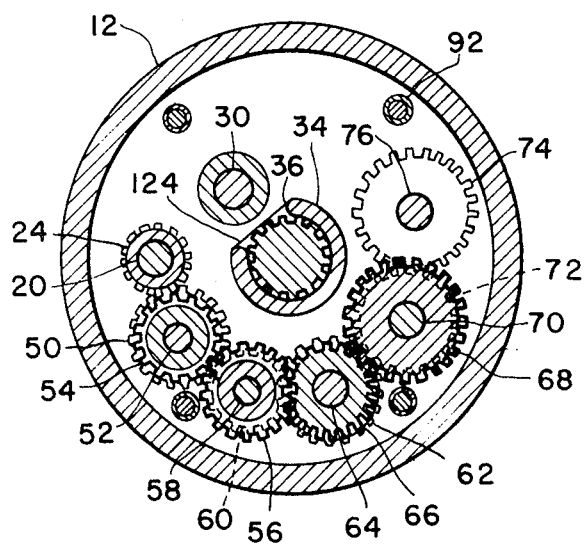
FIG. 5 is a view of the section taken along the line 5-5 in FIG. 2.

In the second power path, which is shown in FIGS. 3 and 5, rotative power is transmitted via gear 24 to gear 50, fixed to shaft 52. Gear 54, also fixed to shaft 52, meshes with gear 56 which is secured to shaft 58, which also has fixed thereto gear 60. Gear 60 in turn meshes with gear 62 fixed to shaft 64, gear 66 fixed to shaft 64 meshes with gear 68 fixed to shaft 70, gear 72 fixed to shaft 70 meshes with gear 74 fixed to shaft 76, and gear 78 fixed to shaft 76 meshes with final feed gear 80.

These various gears and shafts are positioned and retained in gear plates 82 and 84 by means of bearings 86, bushings 88, and spacers 90 where necessary. Gear plate 84 is positioned in the housing 12 by means of spacers 92 and screws 94. Gear 80, which has bronze thrust surfaces 81, is positioned laterally on one side by tubular extension 96 of gear plate 84, having a flange 98 formed thereon and engaging thrust surface 81 of gear 80. On the other side, thrust washer 100 engages the other thrust surface 81 of gear 80.

Gear 80 has an internally threaded bore 102 which engages external threads 104 on the small end of carrier 34.

Carrier 34 has an enlarged end 106 which is slidingly fitted into a sleeve bearing 108, retained in housing 12. This enlarged end 106 rotatively supports the boring bar holder 38 and connected spline gear 32 by means of bearings 110 and 112, positioned by spacers 114 and 115. The carrier member engages the spline gear 32 and attached boring bar holder 38 by means of flange 116 formed on the end of the spline gear 32.

Thus movement of the carrier 34 in response to rotation of gear 80 results in similar movement of the boring bar holder 38 while allowing continued driving engagement of gear 28 with the long pinion and allowing simultaneous rotation of the boring bar holder 38 in the bearings 110 and 112.

In order to provide a visual depth indicator, housing 12 and bearing 108 are slotted at 118, and indicator plug 120 is provided so that as the bearing housing progresses from left to right as viewed in FIG. 2, an indication of the depth is obtained.

Carrier 34 must be restrained so that rotation of gear 80 results in linear movement of the carrier 34, rather than merely rotation of carrier 34 and gear 80 as a unit. Plug 120 accomplishes this purpose, and in addition clearance holes in end plate 14, and gear plates 82 and 84 for the carrier 34 are formed with flats 122 (FIG. 1) and 124 (FIG. 5) to cooperate with the flat formed by the longitudinal groove 36 (FIGS. 4 and 5) in the carrier 34 to also restrain rotation while allowing linear movement of the carrier 34. This arrangement also provides maintenance of proper registry of the slot 36 with drive gear 28, so as to insure a driving contact.

The components of the automatic feed stop mechanism are shown in FIGS. 1-3 and 6. As seen in FIG. 2, gear 78, which drives the final feed gear 80, is maintained in mesh therewith by means of a feed stop member 126 which is rotatably mounted on the end cap 14 by means of screws 128, and has an arm 130 which engages groove 132 in the shaft head 134, so that compression spring 136 cannot move shaft 76 to the left (FIG. 2) and disengage gears 78 and 80. When arm 130 does not restrain shaft 76, the compression spring 136 moves shaft 76 to the left until spacer 138 fixed to the shaft abuts gear plate 84, and gears 74 and 78 are out of mesh with their mating gears. This movement is indicated in phantom in FIG. 3, and produces a feed stop since gear 80 is no longer rotated.

In order to control automatically the disengagement of feed stop arm 130, a feed stop rod 140 is provided, which has a threaded section 142 securing it to the carrier 34, so that it moves therewith.

Fastened to the feed stop rod 140 is the feed stop initiator 144, which has a clearance hole with a flat formed thereon to cooperate with a similar flat on the feed stop rod 140 so that it is properly oriented and to provide an effective engaging surface for threaded plug 146, serving to selectively secure the feed stop initiator at any selected point along the feed stop rod 140. As seen in FIGS. 1 and 6, feed stop initiator 144 and feed stop 126 have cooperating camming members so that as the feed rod 140 progresses toward the right, it cams the feed stop 126 to rotate in a clockwise manner and releases shaft 76 to effectively stop the feeding of the boring bar. These cam members are a pin 148 secured to feed stop initiator 144 and a sloping surface 150 machined on the other arm 152 of the feed stop 126. The distance "A" in FIG. 6 represents the feed distance which is selectively varied by moving the feed stop initiator's position on the feed stop rod 144.

The boring bar 18 is accurately positioned to run true by the bearing 154 rotatably supporting it in the adapter cap 16, and may also be piloted in the hole to be enlarged by the external boss 156. A number of adapter caps 16 may be supplied to accommodate various boring bars and hole sizes.

In operation, a suitable boring bar 18 is inserted into the holder 38, and the cutting edge of the tool is set using the machined flat 13 as a reference. The cutting depth is then set by adjusting the position of the feed stop initiator 144 on the feed stop rod 140. The housing 12 is then clamped into position on a suitable drill jig, and the boring operation is begun by rotating the input shaft, either by hand or with a power tool.

Rotation of input shaft 20 acting through gears 26, 28 and 32 causes a rotation of the boring bar, and while acting through gears 24, 50, 54, 56, 60, 62, 66, 68, 72, 74, 78 and 80 causes the carrier 34, holding the spline gear 32 and boring bar holder 38, to advance slowly due to the coaction of threads on gear 80 and carrier 34. As it does so, feed stop initiator 144 approaches feed stop member 126 until the cooperating cam surfaces disengage arm 130 from groove 132 and shaft 65 moves to the left and cuts off power to the gear 80, causing a feed stop.

Thus it can be seen that an extremely compact boring bar drive mechanism has been provided which features a controlled feed rate and an automatic feed stop without the incorporation of separate, bulky gear drives and mechanisms.

While this mechanism is especially advantageous when used to drive boring bars, it of course may also be used in drilling, reaming, and tapping operations, and by incorporating pickoff gears in the feed drive train to provide variable feed drive ratios, may be especially advantageous in this last use. In addition, standard improvements may be incorporated, such as the use of an overload clutch in the power train, etc.

Therefore, the invention is not to be limited to the disclosed embodiment but only by the following claims.

What I claim as new and desired to be secured by Letters Patent of the United States is:

1. A drive mechanism for a cutting tool comprising:
   a housing;
   an input shaft rotatably supported in said housing;
   a carrier member slidably supported in said housing;
   an output member rotatably supported in said carrier member and retained against relative linear movement;
   means for removably fastening a cutting tool to said output member;
   first drive means drivingly connecting said carrier and said input shaft providing sliding movement of said carrier in response to rotation of said input shaft;
   second drive means including an elongated spline gear attached to said output member providing for rotation of said output member in response to rotation of said input shaft throughout the sliding travel of said carrier member in said housing;
   whereby said output member is rotated and advanced in response to rotation of said input shaft.

2. The mechanism of claim 1 wherein said spline gear is rotatably supported in a portion of said carrier member which is slotted parallel to the axis of said spline gear, and wherein said second drive means also includes a gear and means positioning said gear in mesh with said spline gear through said slot.

3. The drive mechanism of claim 1 wherein said first drive means includes a gear train having a plurality of shafts rotatably supported in said housing disposed along a circle with the centerline on that of the axis of rotation of said output member and each shaft having a pair of gears fixed thereon positioned with one of said gears enmeshed with the gear fixed to the succeeding shaft the last gear in said gear train being a feed drive gear threadedly engaging the carrier member and including means providing the driving connection from said gear train to said feed drive gear; said second drive means includes a plurality of gears said gears having axes of rotation parallel to each other and to the axes of rotation of said output member and said input member; whereby all of the rotating parts of the drive mechanism rotate about closely spaced, parallel axes.

4. A drive mechanism for a boring bar comprising:
   a housing;
   an input shaft rotatably mounted in said housing and having a first and second gear fixed thereto;
   a carrier member slidably mounted in said housing and restrained from rotation;
   an output member rotatably mounted in said carrier member;
   means for connecting said boring bar to said output member;
   a spline gear fixed to said output member and rotatably supported by a portion of said carrier member slotted along the axis of said spline gear;
   a feed gear train including a feed gear threadedly mounted on a portion of said carrier and restrained from linear movement, a plurality of shafts rotatably mounted in a progression about the axis of rotation of said spline gear, each shaft having a pair of gears fixed thereon and arranged so that a first one of said shafts has one of its gears meshed with said first gear, and the other meshed with a gear on a succeeding shaft, and said other gear on said succeeding shaft meshing with a gear on a further succeeding shaft and the other gear meshing with a gear on a still further succeeding shaft and further shaft gears meshing in like manner, and one gear fixed on the last shaft in said progression meshing with said feed gear in at least one position of said last shaft;
   and a drive gear train including a drive gear rotatably mounted in mesh with said second gear and with said spline gear, whereby rotation of said input shaft produces both rotation and linear movement of said boring bar.